July 14, 1925.
J. A. LIPPERT
1,546,141
WHEEL RIM
Filed Aug. 23, 1924
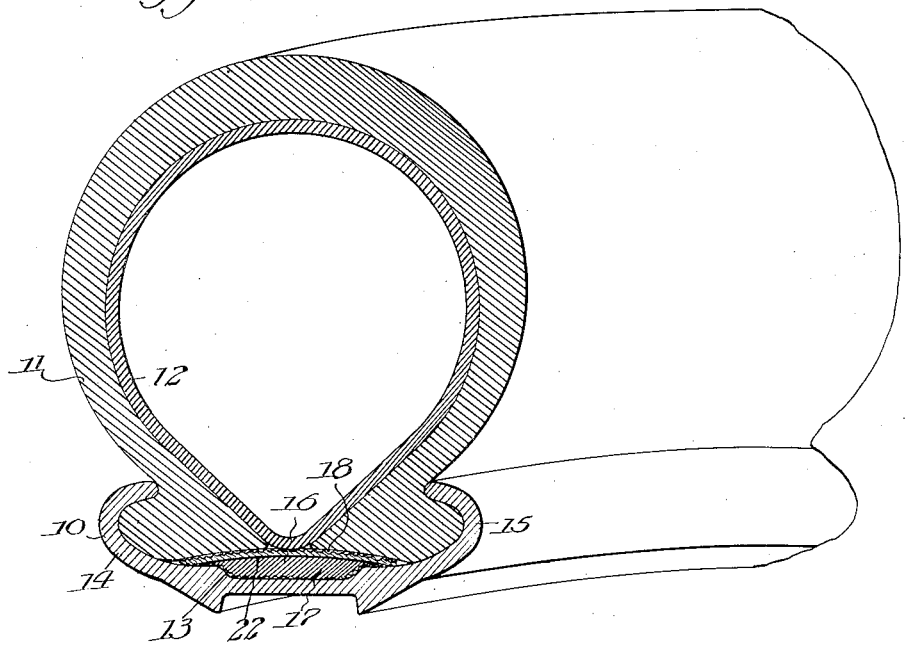
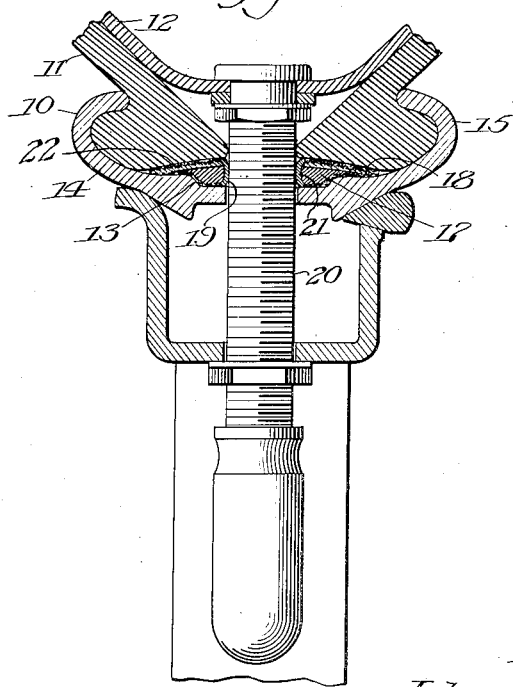
Inventor:
John A. Lippert Patented July 14, 1925.

1,546,141

UNITED STATES PATENT OFFICE.

JOHN A. LIPPERT, OF CHICAGO, ILLINOIS.

WHEEL RIM.

Application filed August 23, 1924. Serial No. 733,673.

*To all whom it may concern:*

Be it known that I, JOHN A. LIPPERT, a citizen of the United States, residing at Chicago, in the county of Cook and State of Illinois, have invented certain new and useful Improvements in Wheel Rims, of which the following is a full, clear, concise, and exact description, reference being had to the accompanying drawings, forming a part of this specification.

The invention relates to improvements in wheel rims and particularly to rims with which a pneumatic tire composed of an outer casing and an inner tube is adapted to be associated.

The invention has as its prime object the provision of a construction which will eliminate the necessity of the use of a liner such as is now extensively employed and arranged between the tube of the tire and the rim of the wheel, this liner if not properly located with respect to the tube, casing and rim often times pinches the tube and causes the formation of a cut or aperture in the tube. In some instances the liner is entirely omitted resulting in the adherence of the tube to the rim with the consequent result that the tube becomes torn and rendered worthless due to sudden stopping of the vehicle and also to improper inflation of the tire.

It is an object of the invention to provide a rim having a construction which will eliminate the above objections and which will in addition allow the ready association of the tube and casing with the rim.

It is a further object of the invention to provide the rim with a groove for the reception of a suitable material which is preferably of a noncorrosive character and to arrange said material so that it may engage the tube when the latter and the casing is associated with the rim.

In addition it is an object to employ a material which is of a relatively soft character and to provide a covering for the material so as to protect the material and lengthen its period of use.

It is a feature of the invention to employ a band of material such as rubber and to cover this with a strip of suitable material such as cork the latter acting as a separator to prevent the rubber of the tube from amalgamating with the rubber band which is secured to the rim.

It is another feature to cover both the band and cork strip with a fabric to protect the cork and prevent its being chipped away or otherwise injured.

The invention has these and other objects all of which will be explained and more readily understood when read in conjunction with the accompanying drawings which illustrate one embodiment of which the invention is susceptible it being obvious that changes and modifications may be resorted to without departing from the spirit of the appended claims forming a part hereof.

In the drawings Fig. 1 is a perspective view of a portion of a rim, outer casing of a tire and tube, the rim being provided with a means for accomplishing the invention and Fig. 2 is a transverse section of a rim illustrating the construction of the rim at the stem of the tube.

In the embodiment of the invention illustrated in the drawing the rim 10 with which the casing 11 and tube 12 are to be associated is provided with a groove 13 which is located midway between the inturned flanges 14 and 15 of the rim 10. This groove 13 preferably extends throughout the entire circumference of the rim, and is of a depth sufficient to receive the element generally designated 16 which is secured to the rim in any suitable manner as by being glued or riveted thereto. The element 16 is composed of relatively soft material 17 such as rubber or other composition, which will not corrode or be affected by moisture etc. A strip of suitable material 22 such as cork provides a separator and prevents amalgamation of the tube and the rubber 17 and the fabric covering 18 which encloses the cork and rubber and protects them. The cork strip preferably extends beyond the sides of the rubber portion or element 17 so as to compensate for different distances which exist between the inner edges of the casing when associated with the rim and insures against contact between the tube and the rim. These edges also tend so as to permit of their being interposed between the under faces of the casing and the rim. The element 16 is further provided with an aperture 19 for the purpose of permitting the stem 20 of the tube to be passed therethrough when it is desired to associate or remove the casing and tube from the rim. To prevent wear at this point the aperture is provided with a metallic tubular element 21.

From the foregoing explanation of the structure it is manifest that a construction is produced which will at all times remain in place during the changing of the tire and which can not assume a position which will pinch the tube and puncture it.

It is further evident that an arrangement is provided which will prevent adherence of the tube and the rim at the space produced between the termination of the sides of the casing, and which will also prevent adherence of tube and rim and also amalgamation of the tube and element 16.

Having thus described the invention what I claim and desire to cover by Letters Patent is:

1. A wheel rim with which a tire composed of an outer casing and an inner tube is adapted to be removably associated, said rim having a band permanently secured thereto and arranged between the edges thereof with which the tube is permitted to engage when the tube is associated with the rim, said band being composed of material which is of a relatively different character than the material of which the rim is formed and having a strip of heat insulating material provided along that face thereof which engages with said tube.

2. A wheel rim with which a tire composed of an outer casing and inner tube is adapted to be removably associated, a groove provided in said rim and relatively soft material permanently arranged in the groove and having a covering of material which extends across the face thereof, said last mentioned material being provided to prevent contact of the tube and the relatively soft material when said tire is associated with the rim.

3. A wheel rim with which a tire composed of an outer casing and an inner tube is adapted to be removably associated, a groove provided in said rim and noncorrosive material arranged in said groove, said material being located so as to allow the tube to engage therewith when said tire is associated with the rim, the side edges of said material being extended beyond the side edges of the groove and being of a lesser thickness than that portion thereof which is arranged in said groove.

4. A wheel rim with which a tire composed of an outer casing and an inner tube is adapted to be removably associated, a groove provided in said rim and relatively soft material arranged in said groove, a covering of noncorrosive material for said relatively soft material with which the tube is permitted to engage when the tube is associated with the rim, 5. A wheel rim with which a tire composed of an outer casing and an inner tube is adapted to be removably associated, a groove provided between the edges of said rim and relatively soft noncorrosive material permanently arranged in said groove, said material being located so as to prevent the tube from engaging with said rim when said tire is associated with the rim, and said material being provided with an aperture having a metallic tubular element through which the stem of said tube is permitted to be passed.

6. A strip adapted to be arranged between the tube of a tire and a rim when the tire is associated with said rim, said strip being composed of rubber, a piece of superposed cork and fabric forming a cover for the cork.

7. A strip adapted to be arranged between the tube of a tire and a rim, said strip being composed of a band of relatively soft material, a strip of material which is impervious to moisture and providing a heat insulator material and material forming a covering for said second mentioned material.

In witness whereof, I hereunto subscribe my name this 26th day of July A. D., 1924.

JOHN A. LIPPERT.